(12) United States Patent
Chitre

(10) Patent No.: US 12,367,118 B2
(45) Date of Patent: Jul. 22, 2025

(54) MOBILE DEVICE MANAGEMENT AGENT ROLLBACK SYSTEMS AND METHODS

(71) Applicant: Esper.io, Inc., Bellevue, WA (US)

(72) Inventor: Varun Chitre, Bellevue, WA (US)

(73) Assignee: Esper.io, Inc., Bellevue, WA (US)

( * ) Notice: Subject to any disclaimer, the term of this patent is extended or adjusted under 35 U.S.C. 154(b) by 132 days.

(21) Appl. No.: 18/378,881

(22) Filed: Oct. 11, 2023

(65) Prior Publication Data

US 2024/0126664 A1 Apr. 18, 2024

Related U.S. Application Data

(60) Provisional application No. 63/415,459, filed on Oct. 12, 2022.

(51) Int. Cl.
*G06F 11/20* (2006.01)

(52) U.S. Cl.
CPC .... *G06F 11/2023* (2013.01); *G06F 2201/805* (2013.01)

(58) Field of Classification Search
CPC ........ H04L 63/08; H04L 63/20; H04W 12/37; G06F 21/12; G06F 21/51; G06F 21/56; G06F 21/62; G06F 21/6218; G06F 11/2023; G06F 11/2038; G06F 11/2043; G06F 11/2046
See application file for complete search history.

(56) References Cited

U.S. PATENT DOCUMENTS

| 9,426,120 | B1 | 8/2016 | Kim et al. | |
|---|---|---|---|---|
| 9,672,338 | B1 | 6/2017 | Kim et al. | |
| 9,762,444 | B1 | 9/2017 | Kim | |
| 10,432,665 | B1 | 10/2019 | Yohai et al. | |
| 11,785,469 | B1 | 10/2023 | Gendler | |
| 2005/0132351 | A1 | 6/2005 | Randall et al. | |
| 2015/0319251 | A1* | 11/2015 | Kim | H04L 9/40 709/223 |
| 2016/0191567 | A1 | 6/2016 | Chahal et al. | |
| 2018/0007556 | A1 | 1/2018 | Lu et al. | |
| 2023/0370530 | A1* | 11/2023 | Kalke | H04L 67/55 |

OTHER PUBLICATIONS

Tatte et al., "Mobile Device Management a Functional Overview." 2013, International Journal of Computer Science and Application 6.2 (Year: 2013).*

* cited by examiner

*Primary Examiner* — Michael Maskulinski
(74) *Attorney, Agent, or Firm* — Constellation Law Group, PLLC; Dale C. Barr

(57) ABSTRACT

Systems and methods for mobile device management (MDM) agent rollback are disclosed. In some embodiments, a system configured to perform operations including: detecting a triggering event during operation of a first MDM agent; designating the first MDM agent as a bad agent; designating a second MDM agent as a new active agent; determining whether a first data generated by the first MDM agent is useable for continued operations by the second MDM agent; if the first data is determined to be useable by the second MDM agent, then activating the second MDM agent for continued operations using the first data; and if the first data is determined to be not useable by the second MDM agent, then activating the second MDM agent with known good data.

20 Claims, 5 Drawing Sheets

MOBILE DEVICE MANAGEMENT AGENT ROLLBACK SYSTEMS AND METHODS

FIELD OF THE DISCLOSURE

The present disclosure relates generally to mobile device management, and more specifically, to mobile device management agent rollback systems and methods.

CROSS REFERENCE TO RELATED APPLICATIONS

This patent application claims priority benefits under 35 USC § 119(e) from the following U.S. provisional patent application: U.S. Provisional Patent Application No. 63/415,459 filed on Oct. 12, 2022, which application is incorporated herein by reference.

BACKGROUND

Many contemporary business enterprises employ mobile computing devices for a wide variety of purposes, including product sales, inventory management, communications, tracking, record keeping, and other suitable purposes. An MDM (Mobile Device Management) agent is typically a privileged component within a managed device which handles the business logic of an MDM company for managing the device. A fully functioning MDM agent is critical for any MDM company since it is a gateway that facilitates the communication with the device in the field which controls the management of the device.

In any operating system, however, crashes of an application are possible. Since, an MDM agent is an application as well, a crash or a malfunction due to a bad update is possible. Accordingly, systems and methods for enabling an MDM device to readily recover from a crash or malfunction of an MDM agent would provide considerable utility.

SUMMARY

Systems and methods for mobile device management (MDM) agent rollback are disclosed herein. In some embodiments, systems and methods in accordance with the present disclosure may advantageously provide substantially improved recovery capabilities of MDM devices from crashes or other anomalous operations. More specifically, embodiments of systems and methods for MDM agent rollback as disclosed herein may advantageously provide improved protection and recovery from an undesirable scenario (e.g. crash, communication loss, etc.) experienced by an MDM agent, thereby providing improved reliability and performance of MDM devices.

For example, in some embodiments, a system is configured to perform operations including: detecting a triggering event during operation of a first MDM agent; designating the first MDM agent as a bad agent; designating a second MDM agent as a new active agent; determining whether a first data generated by the first MDM agent is useable for continued operations by the second MDM agent; if the first data is determined to be useable by the second MDM agent, then activating the second MDM agent for continued operations using the first data; and if the first data is determined to be not useable by the second MDM agent, then activating the second MDM agent with known good data.

In some embodiments, detecting a triggering event during operation of a first MDM agent comprises detecting a crash of the first MDM agent. In some embodiments, detecting a triggering event during operation of a first MDM agent comprises detecting a commands reachability failure. And in some embodiments, detecting a triggering event during operation of a first MDM agent comprises detecting a manual initiation of an MDM agent rollback.

In addition, in some embodiments, a system for operating one or more mobile device management (MDM) agents comprises: a processor; a memory operatively coupled to the processor, the memory storing an MDM master, a first MDM agent designated as an active agent, and a second MDM agent designated as an inactive agent, wherein the MDM master is configured to perform operations including: detecting a triggering event during operation of the first MDM agent; designating the first MDM agent as a bad agent; re-designating the second MDM agent as the active agent; and determining whether to allow the second MDM agent to use data generated by the first MDM agent or to use other data associated with the second MDM agent.

There has thus been outlined, rather broadly, some of the embodiments of the present disclosure in order that the detailed description thereof may be better understood, and in order that the present contribution to the art may be better appreciated. There are additional embodiments that will be described hereinafter and that will form the subject matter of the claims appended hereto. In this respect, before explaining at least one embodiment in detail, it is to be understood that the various embodiments are not limited in its application to the details of construction or to the arrangements of the components set forth in the following description or illustrated in the drawings. Also, it is to be understood that the phraseology and terminology employed herein are for the purpose of the description and should not be regarded as limiting.

To better understand the nature and advantages of the present disclosure, reference should be made to the following description and the accompanying figures. It is to be understood, however, that each of the figures is provided for the purpose of illustration only and is not intended as a definition of the limits of the scope of the present disclosure. Also, as a general rule, and unless it is evident to the contrary from the description, where elements in different figures use identical reference numbers, the elements are generally either identical or at least similar in function or purpose.

BRIEF DESCRIPTION OF THE DRAWINGS

Embodiments of methods and systems in accordance with the teachings of the present disclosure are described in detail below with reference to the following drawings.

DETAILED DESCRIPTION

Systems and methods for mobile device management agent rollback are described herein. Many specific details of certain embodiments are set forth in the following description and in FIGS. 1-6 to provide a thorough understanding of such embodiments. One skilled in the art will understand, however, that the invention may have additional embodiments, or that alternate embodiments may be practiced without several of the details described in the following description.

Embodiments of systems and methods for mobile device management (MDM) agent rollback as disclosed herein may advantageously provide improved protection and recovery from a crash or malfunction of an MDM agent. For example, it will be appreciated that at least some mobile device operating systems (e.g. Android) do not currently allow downgrade of production applications, including an MDM agent application. Accordingly, embodiments of systems and methods for MDM agent rollback as disclosed herein may use intelligent modular restructuring and inter-process communication to securely rollback individual components, as described more fully below.

Figure 1:
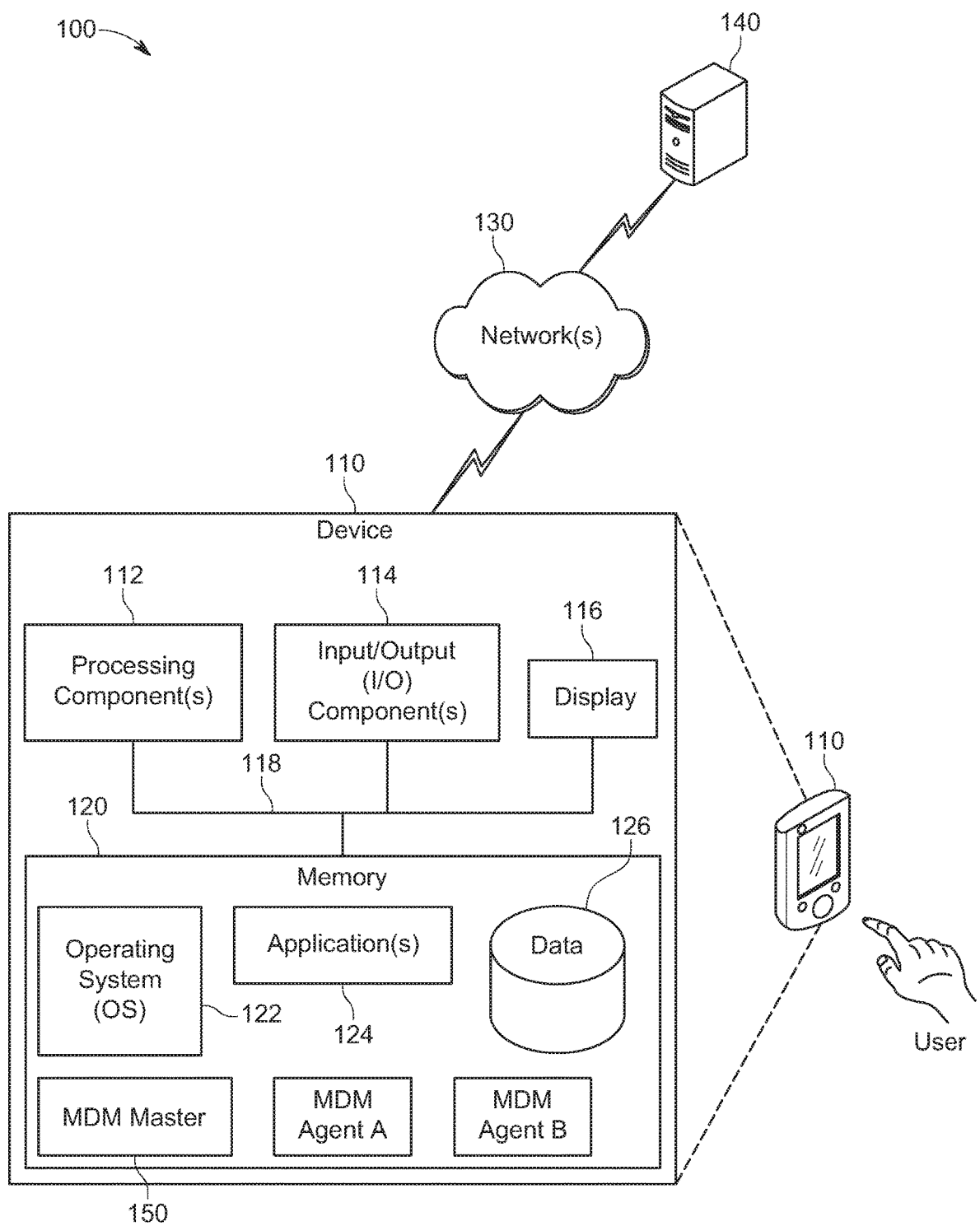
FIG. 1 shows an embodiment of a representative environment for implementing techniques and technologies in accordance with the present disclosure.

FIG. 1 is an embodiment of a representative environment 100 for implementing techniques and technologies in accordance with the present disclosure. In this embodiment, the environment includes a device 110 operatively coupled by one or more networks 130 to a provisioning system 140. The one or more networks 130 may include wireless (or wired) networks, and may enable the provisioning system 140 to communicate with the device 110 from any desired location.

In this embodiment, the device 110 includes one or more processing components 112, one or more input/output (I/O) components 114, and a display 116, all of which are operatively coupled to a memory 120 via a bus 118. As further shown in FIG. 1, the memory 120 may store an operating system (OS) 122, one or more applications 124, data 126, or any other suitable information or facilities. In at least some embodiments, the operating system 122 may be an Android operating system developed by the Open Handset Alliance and commercially sponsored by Google, Inc. (e.g. AOSP, Android 9, Android 13, etc.).

In the embodiment shown in FIG. 1, the memory 120 of the device 110 also stores customized MDM applications, including an MDM master 150, an MDM agent A, and an MDM agent B. As noted above, an MDM agent is typically a privileged component within a managed device which handles the business logic of an MDM company for managing the device. In at least some implementations, the MDM agent A is a more recently-installed version of the MDM agent, and the MDM agent B is a prior or previously-installed version of the MDM agent. More specifically, the MDM agent A may be an updated version of MDM agent B having new features, functionalities, or operational characteristics, while MDM agent B may be a previous version that operated successfully on the device 110.

In some embodiments, the MDM master 150 may perform various operations involved in MDM agent rollback as described more fully below. For example, during installation of the updated version, the MDM master 150 may designate MDM agent A as the "active agent," and may designate MDM agent B as the "inactive agent." It will be appreciated that, in alternate embodiments, the device 110 may have a greater or fewer number of MDM applications, and that the embodiment shown in FIG. 1 is merely one particular embodiment in which techniques and technologies in accordance with the present disclosure may be implemented.

Figure 2:
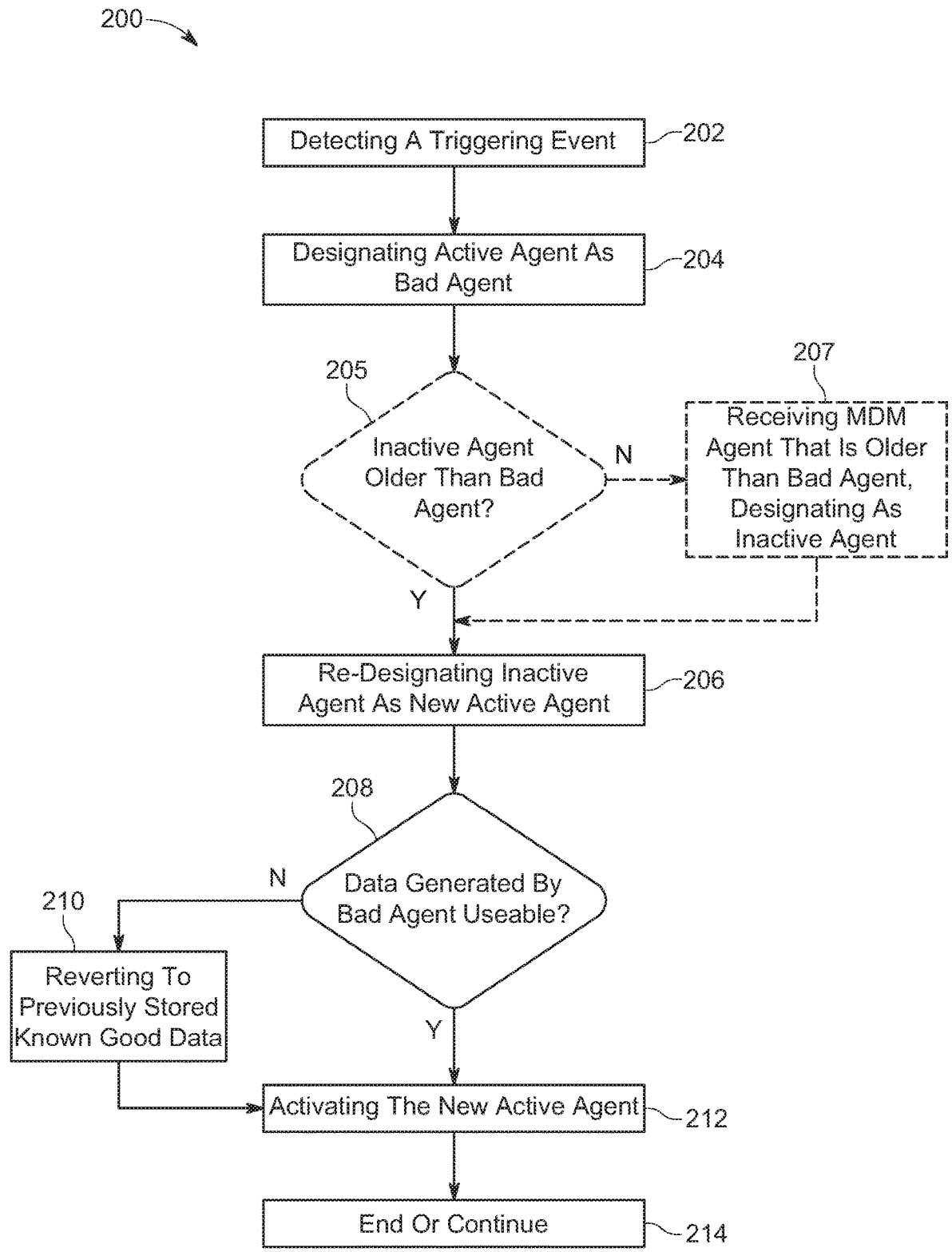
FIG. 2 shows an embodiment of a first process for mobile device management agent rollback in accordance with the present disclosure.

FIG. 2 is an embodiment of a process 200 for MDM agent rollback in accordance with the present disclosure. In this embodiment, the process 200 includes detecting a triggering event at 202. For example, in at least some implementations, the detecting of the triggering event (at 202) may include detecting an unrecoverable MDM agent crash, detecting that the device 110 or the active MDM agent is unreachable by the provisioning system 140, or detecting a manual initiation of a rollback (e.g. by a user).

After detecting a triggering event (at 202), the process 200 includes determining which of the MDM agents is currently set as the "active agent" (e.g. MDM agent A), and designating this agent as a "bad agent" (i.e. inoperable or not functioning as desired) at 204. In at least some implementations, the MDM master 150 performs the determining and designating at 204. The process 200 also includes re-designating the "inactive agent" (e.g. MDM agent B) as the new "active agent" at 206. In at least some implementations, the MDM master 150 performs the re-designating at 206.

At 208, the process 200 includes determining whether data previously generated by the bad agent (i.e. MDM agent A) can be reused as is. In at least some implementations, the determining at 208 may be performed by the MDM master 150, the new active agent (e.g. MDM agent B), the provisioning system 140, or any other suitable component or combination of components. The determining at 208 may, for example, involve applying one or more rules or policies established by the developer of the MDM applications. For example, in at least some implementations, if the rollback was initiated intentionally by a managing entity (e.g. a manually initiated rollback), then the determining (at 208) may simply be based on a pre-defined rule regarding how to deal with the previously-generated data (e.g. use it as is, or restore data that has been previously saved, etc.). In some implementations, the determining (at 208) may be left to the discretion of the MDM Master 150, or another entity such as the new active agent (e.g. MDM agent B), or the provisioning system 140, or may be determined remotely by another component or by a suitable person, or by other suitable means.

If it is determined that the data generated by the bad agent is not usable (at 208), then the process 200 includes reverting to previously stored known good data at 210. For example, in some implementations, the known good data (at 210) may be data that were previously stored in memory 120 during operation of the previous version of the MDM agent (e.g. MDM agent B) prior to the installation and operation of the bad agent (e.g. MDM agent A).

As shown in FIG. 2, the process 200 may further include activating the new active agent at 212. In at least some implementations, the activating at 212 may be performed by the MDM master 150, the provisioning system 140, or any other suitable component or combination of components. The process 200 then ends or continues to other operations at 214.

It will be appreciated that the process 200 described above and shown in FIG. 2 is merely one particular implementation, and that various alternate implementations of MDM agent rollback in accordance with the present disclosure may be conceived. For example, in some alternate implementations, prior to the re-designating of the inactive agent as the new active agent at 206, the process 200 may determine whether the inactive agent (e.g. MDM agent B) is indeed older than the bad agent (e.g. MDM agent A) at 205. It will be appreciated that in some circumstances, the inactive agent may not be older than the bad agent (at 205), such as may be the case when a first attempted rollback doesn't recover the device 110 (or environment 100) to a proper working state. If the inactive agent is not older than the bad agent, then the process 200 may further include receiving another version of an MDM agent (e.g. from memory 120 on the device 110, or from the provisioning system 140, etc.) that is older than the bad agent (i.e. a previous, known good working version of MDM agent), and then designating that older version of the MDM agent as the inactive agent at 207, which is then re-designated as the new active agent at 206 as shown in FIG. 2.

Systems and methods in accordance with the present disclosure may provide substantial advantages over the prior art. For example, such systems and methods may reduce or eliminate possible adverse effects that may result from a crash or malfunction of an MDM agent, particularly when updated versions of MDM agents with new features and capabilities are being installed. This may in turn significantly reduce the time, effort and expense associated with remedying such crashes or malfunctions of an MDM agent, resulting in improved satisfaction for business enterprises operating such MDM agents.

Device Owner

In general, it will be appreciated that an MDM master (or Device Policy Controller (DPC)) operating on an Android device typically acts as a so-called "device owner" because it obtains the device owner privileges through different provisioning methods such as AFW (Android for Work), 6-taps QR Code, etc. As a device owner, the MDM master is able to control several aspects of a device such as camera, ability to factory reset, silent application installation, or other suitable privileges. Since there typically exists only one device owner, if a fatal crash of the MDM master occurs, it is not enough to simply activate another working copy of the MDM master because it simply wouldn't work because there is preferably only one device owner, and all the operations that require device owner privileges would simply fail without designating the new MDM master as the device owner.

Separation of Components

In at least some implementations, at a high level, embodiments of systems and methods in accordance with the present disclosure may consider an MDM agent and MDM master to be composed of two general types of components: (1) Privileged Components that require device owner privileges such as, for example, Silent Installation & Management of Apps, Enforcer of Policies (e.g. a set of policies established by a business entity), Kiosk Mode Manager (e.g. LockTask Mode), and/or certain commands that require higher privileges (e.g. Wipe, Reboot, Screen Lock, ADB toggle, Bugreport, etc.); and (2) General Components that can work without device owner privileges such as, for example, Device Status Updates, Remote Viewer & Remote Control, All Supervisor-based Operations, Device Settings Management, and/or Reception & Processing of Commands (minus some privileged commands listed in the first bullet point as Privileged Components).

In some embodiments, the separation of components between Privileged Components and General Components is desirable to reduce the surface area of an impact and make recovery an easier task when things go bad. It also helps in evaluating the degree of damage in an event of crisis. Although specific representative examples of Privileged Components and General Components have been shown above to facilitate an understanding of representative implementations, it should be appreciated that in alternate implementations, various other privileges may be categorized as Privileged Components and General Components. And in still other implementations, some of the above-noted General Components may be re-categorized as Privileged Components and vice versa.

Representative Scenarios:

Scenario 1—MDM Agent (or DPC) Crash

When an application (such as the MDM agent) goes through an event that it is not prepared for, this condition leads itself to an event called an "exception" which if not handled leads to a crash of the application. This scenario may be referred to as an "MDM Agent Crash." After an application crashes, the OS may attempt to restart the application in a hope that the problem is gone. However, the world isn't perfect, and most likely once that event occurs again, there is a high chance of the application crashing again. Therefore, we attempt to (1) avoid the event from happening in the first place; and/or (2) prepare to handle it, if that occurs.

Scenario 2—Commands Reachability Failure

In some conditions, the MDM agent may be working well and stable, however, the commands from the MDM agent stop reaching the device 110. This scenario may be referred to as a "Commands Reachability Failure."

These two types of scenarios may ultimately, at a later point, require human intervention to fix the root cause, however, in at least some implementations, something typically needs to be done during the interim, until the actual problem is fixed. This is an example of circumstances where separation of components may be important.

Recovery:

As described above, embodiments of systems and methods in accordance with the present disclosure may resolve a representative scenario (e.g. MDM Agent Crash, Commands Reachability Failure, etc.) by restoring a working version of the MDM agent. More specifically, at least some embodiments of systems and methods in accordance with the present disclosure may have copy A and copy B of the MDM agent's General Components. At a given time, the MDM agent will be operational using one of the copies (e.g. copy A). When an MDM agent update comes, the other copy (e.g. copy B) is updated and the MDM agent will then switch to the updated copy (copy B). If something goes wrong during operation of the updated copy (copy B), the MDM agent may switch back to the previously-operating copy (copy A) seamlessly. Alternately, if everything goes well, the updated MDM agent (copy B) continues operating properly, and when the next update comes, the update will be applied to the previously-operating copy (e.g. copy A) and the same flow would be followed.

In some implementations, however, the Privileged Components, may still be at risk. For example, Privileged Components typically can have only one copy, because there typically can only be one device owner.

In general, in some implementations, the Privileged Components may be relatively large in size and may contain substantial information regarding an MDM entity's business logic. For example, in at least some implementations, the seamless application installation may be required to deal with a lot of things other than its core purpose such as, for example, an SDK (Software Development Kit) Version of the APK (or Android Package, Android Package Kit, Android Application Package), and Hash Integrity of it.

In some implementations, systems and methods in accordance with the present disclosure may advantageously convert one or more of the Privileged Components into a reduced, bare-boned version of the same that is less likely to be employed or touched once finalized and implemented. For example, in at least some implementations, the Silent App Install Lite Version may be reduced to only deal with accepting the APK, sending it to the PackageManager API for installation directly and return its responses by moving the business logic part of it into a new General Component viz. Silent App Install Manager. Accordingly, in some implementations, by streamlining the Privileged Components by moving the business logic part of it into a new General Component, embodiments in accordance with the present disclosure reduce the risk by taking away the parts that could change often.

Figure 3:
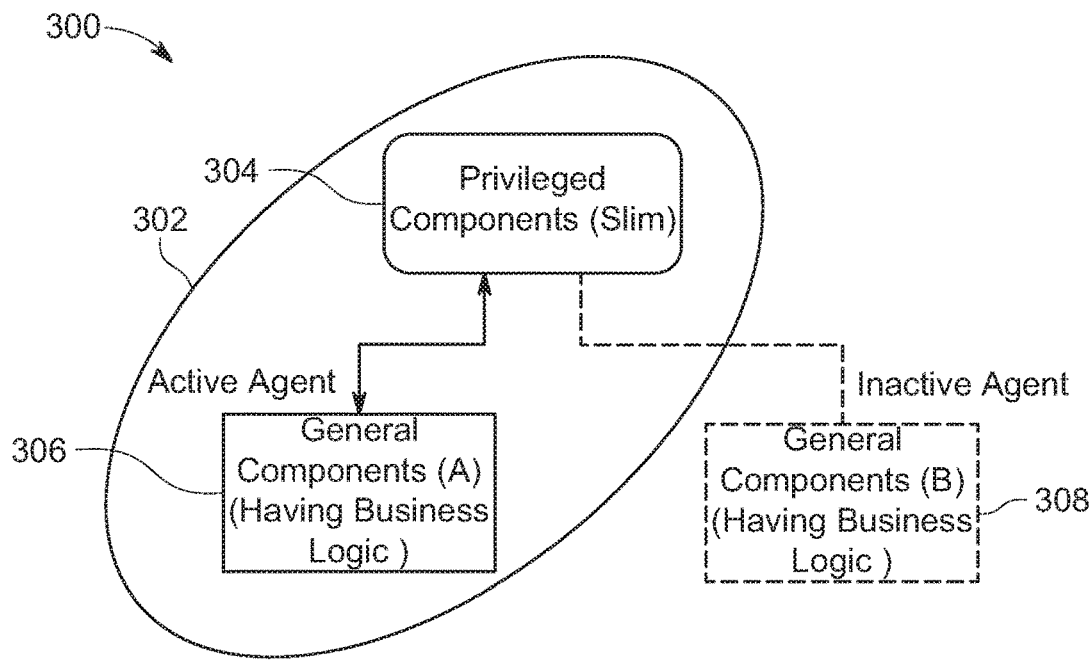
FIG. 3 shows an embodiment of MDM components in accordance with the present disclosure.

In some embodiments, each of the Privileged Components may be turned into a lite version of itself and one or more new General Components separating the business logic. For example, FIG. 3 shows an embodiment of MDM components 300 in accordance with the present disclosure. In this embodiment, the Privileged Components 302 include a set of lite (or "slim") version Privileged Components 304, and a set of General Components A 306 of the active MDM agent having business logic of the MDM entity (either managed or managing MDM entity, or both). A set of General Components B 308 of the inactive MDM agent is also shown. In some embodiments, the General Components B 308 of the inactive MDM agent may also include business logic of the managed or managing MDM entity (or both) as shown in FIG. 3.

In at least some embodiments, the MDM Master-Agent architecture (e.g. as shown in FIG. 1) may include multiple MDM Agents and an MDM Master. The MDM Agents may have limited capabilities and may primarily follow the MDM Master's instructions. In at least some implementations, the MDM Agent may be a General Components Module, and the MDM Master is a Privileged Component Module which may decide which agent would be an active MDM Agent. To give a clear perspective, in some implementations, "General Components" may have two or more copies i.e. two or more Agents. Each MDM Agent may be considered all "General Components" bundled into an Android Application Package (APK), which is an application on Android. Similarly, the MDM Master may be an APK that includes Privileged Components, the difference being that it will have only one copy.

It will be appreciated that a wide variety of different implementations may be conceived in which some components of an MDM agent are considered "Privileged Components" and other components are considered "General Components." In addition, the components involved in the categorization may depend upon various system details (e.g. operating system) or other characteristics of the system in which the MDM agent is operating. In addition, it should be appreciated that a component may be categorized into a first category for one MDM agent, and then may be categorized into a second category for another MDM agent. As a representative example, the following table shows a representative categorization of Privileged Components and General Components that may be used in one or more particular embodiments, such as for a particular device implementing an Android-based operating system:

| Privileged Components | General Components |
| --- | --- |
| Silent App Installation & Management Lite (Takes APK Path, Returns Output) | Device Status Updates Engine. |
| Generic Policy Enforcer (Takes UserRestriction and a Boolean) | Remote Viewer, Control & Gestures Manager. |
| LockTask Mode Manager Lite (Add/Remove from LockTask) Special Commands: Wipe, Reboot, Screen Lock. ADB toggle, Bugreport—Action & Response only. | All Supervisor-based Operations. Device Settings Management. |
| | Reception, Processing & Management of Commands. Provisioning and Agent Updater (formerly DPC Updater) Module Silent App Installation Manager Policy Enforcer Manager LockTask Mode Manager Special Commands Manager |

Scenario Detection, Notification & Recovery:
Detection of Scenario 1—a Crash.

It will be appreciated that the MDM Agent may be considered to be an application that is independently operating (e.g. sending status updates, honoring commands and so on). In at least some implementations, the MDM Agent may include a diagnostic tool or functionality (e.g. referred to herein as a Monitoring Tool) that provides real time reports of crash-related information as soon as a crash occurs. In such a case, embodiments in accordance with the present disclosure may integrate and initialize a simple library and then start getting the crash reports seamlessly.

In at least some implementations, the Monitoring Tool may implement an interface (e.g. referred to herein as Thread.UncaughtExceptionHandler) which when implemented, will get a callback from Java Virtual Machine (JVM) when a thread is about to be terminated. In some implementations, the callback from the JVM may provide the Exception details and arguments. Additional details regarding a suitable version of the interface Thread.UncaughtExceptionHandler are currently published on a website at docs.oracle.com/javase/7/docs/api/java/lang/ Thread.UncaughtExceptionHandler.html, although other versions of interfaces are also possible In at least some embodiments, an implementation of Thread.UncaughtExceptionHandler is added in the MDM Agent's module, and when it receives a callback, the MDM Master is notified before dying so the master can take relevant action. This advantageously provides the MDM Agent with its own Monitoring Tool functionality.
Detection of Scenario 2—Commands Unreachability.

In at least some implementations, systems and methods may depend on a messaging and notifications facility, such as, for example, FCM (Firebase Cloud Messaging)/MQTT (Message Queue Telemetry Transport), to deliver a command to the device. It may be desirable, however, to provide an alternative fallback medium where the device has ability to pull the commands and execute them, as described more fully below.

In at least some implementations, an MDM Agent may run a test every day and after an MDM Agent update, which will call an API (Application Programming Interface) from a facility or tool that triggers a suitable message to the device (e.g. to the MDM master). In some implementations, if the command is received within a given timeout, the round trip test is a success, but a failure would raise an alarm to the MDM Master. This necessarily should not trigger a rollback routine. The MDM Master consecutively should raise an alarm (e.g. to a user, enterprise personnel, etc.) that this has happened, whereupon an action can be taken where a fallback medium commands are implemented to rectify the alarm. For example, in some implementations, the action could be updation of credentials, or it could be command to force a rollback routine, or it could be a forced Agent update, or any other suitable action that could solve the problem. In some implementations, if it is detected that a subsequent remedial action has failed to provoke the response to command within the designated timeout period, then the alarm is considered to be a triggering event that requires MDM agent rollback.

Data Isolation & Management:

In at least some implementations, the MDM Agent may be considered to have its own state of data. When a switch between two MDM Agents occurs, the management of these states of data will now be described.

In at least some implementations, the MDM Agents will not store their data with them, but rather, the data will be synced with the MDM Master through a suitable syncing tool or facility (e.g. for Android-based devices the syncing tool Content Provider may be used). In such implementations, an MDM Agent will write the data directly into the MDM Master through this Content Provider. In at least some implementations, the Content Provider may exist inside the MDM Master and may have a job of isolation of each MDM Agent's data and also maintaining a replica of data of each MDM Agent.

Figure 4:
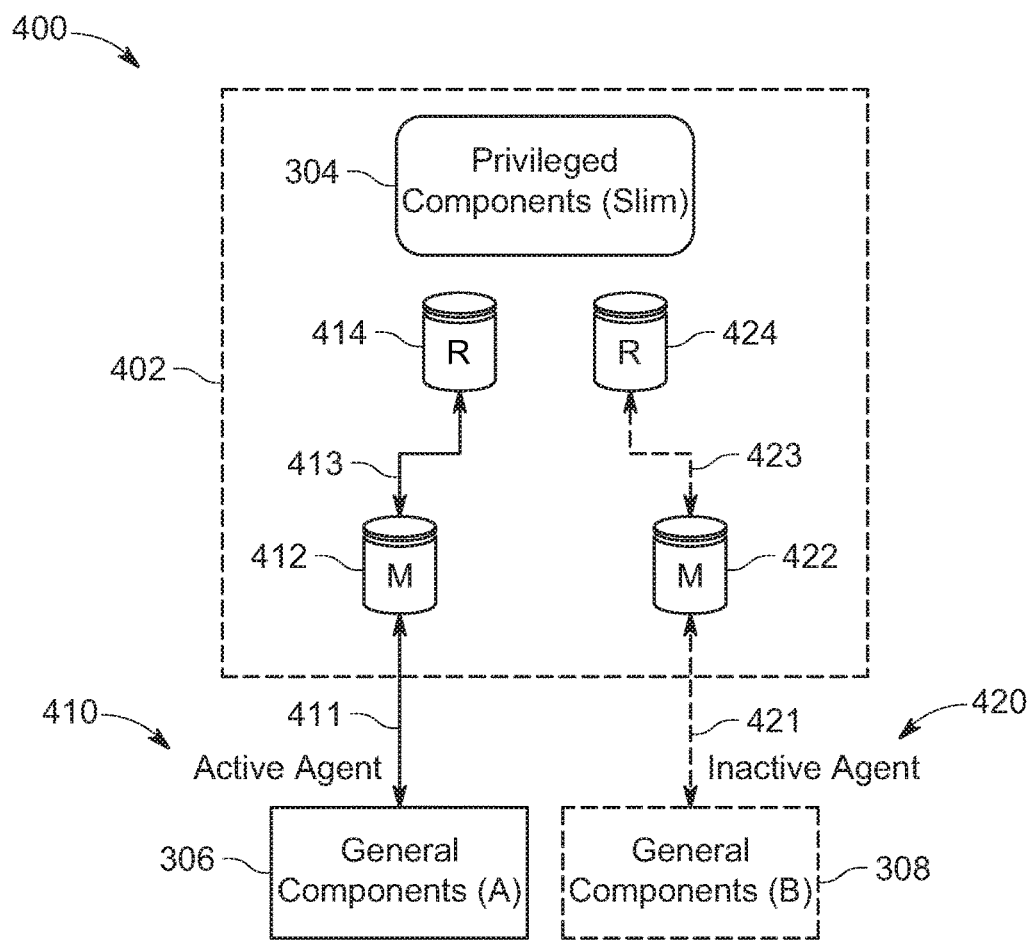
FIG. 4 shows an embodiment of MDM components in a first state in accordance with the present disclosure.

For example, FIG. 4 shows an embodiment of MDM components in a first state 400 in accordance with the present disclosure. As shown in FIG. 4, an MDM Master 402 is configured to operatively communicate with an MDM Agent A (410) which is currently designated as the active agent, and an MDM Agent B (420) which is currently designated as the inactive agent. In the embodiments shown in FIG. 4, the MDM agent A (410) includes a set of General Components A (306) having business logic, and the MDM Agent B (420) includes a set of General Components B (308) having business logic, and the MDM Master 402 includes a set of lite or slim version Privileged Components 304, a first data 412 from the MDM Agent A (410), and a second data 422 from the MDM Agent B (420). The MDM Master 402 further includes a first replica data 414 of the first data 412 from the MDM Agent A (410), and a second replica data 424 of the second data 422 from the MDM Agent B (420). In the first state 400, the active Agent A (410) accesses and updates the first data 412 (indicated by solid arrow 411), which is in turn accessed and updated to the first replica data 414 (indicated by solid arrow 413). Alternately, in the first state 400, the inactive Agent B (420) does not access and update the second data 422 (indicated by dashed arrow 421), and is similarly not accessed and updated to the second replica data 424 (indicated by dashed arrow 423).

With continued reference to FIG. 4, in some embodiments, the first and second replica data (414, 424) of each Agent's data (414, 424) may serve as a source for the other Agent when the currently active MDM agent changes. For example, the inactive Agent B (420) should not be able to read/write the first data 412 of the active Agent A (410) and vice-versa. When the MDM Master 402 switches the active agent from being MDM Agent A (410) to MDM Agent B (420), it will be the job of the new active Agent B to refresh its data based on the replica data 414 of Agent A.

Figure 5:
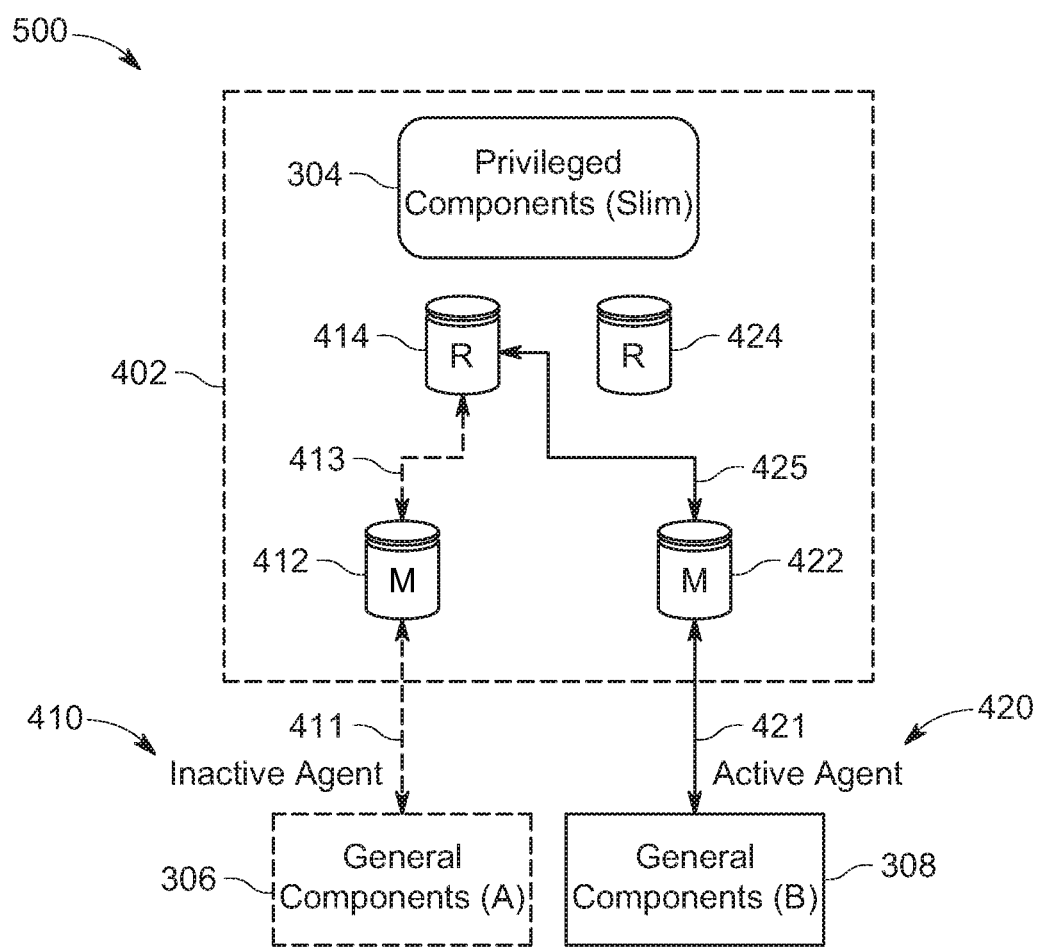
FIG. 5 shows an embodiment of MDM components in a second state in accordance with the present disclosure.

For example, FIG. 5 shows an embodiment of MDM components in a second state 500 in accordance with the present disclosure. As shown in FIG. 5, in the second state 500, the MDM Master 402 has designated the MDM Agent B (420) as the active agent, and the MDM Agent A (410) as the inactive agent. The MDM Agent B (420) therefore is provided (or accesses) the first replica data 414 into the second data 422 (indicated by solid arrow 425) for further operations. In the second state 500, the active Agent B (420) accesses and updates the second data 422 (indicated by solid arrow 421). Alternately, in the second state 500, the inactive Agent A (410) does not access and update the first data 412 (indicated by dashed arrow 411), and similarly does not access and update to the first replica data 414 (indicated by dashed arrow 413).

It will be appreciated, however, that it will not always be the case that the replica data from the other MDM agent is employed at the time of switching between MDM agents. In some conditions, the replica data of the previously active MDM agent could contain the fault as well. In at least some implementations, the MDM Master 402 includes logic to determine whether to allow the new Agent to refresh its data using old Agent's data or continue with its own data. The logic of how the MDM Master 402 will decide whether to allow the new Agent a data refresh permission relies on various flags and or analyses to infer that whether data is responsible for a faulty behavior and not the logic/code. For example, in some implementations, the MDM Master 403 may employ a fixed policy that always treats the data as bad in the event of a rollback. In other implementations, the MDM Master 402 may intelligently infer the usability of data using certain tests, such as, for example, watching for any more crashes or watching for events which caused a previous rollback.

In at least some implementations, embodiments of systems and methods for agent rollback in accordance with the present disclosure can be extended to enterprise applications via exposure of APIs. These APIs can securely store an enterprise's sensitive data in an isolated location, this capability coupled with the rollback techniques and technologies disclosed herein may advantageously allow devices to rollback their applications to the last known good versions without any loss of data.

Figure 6:
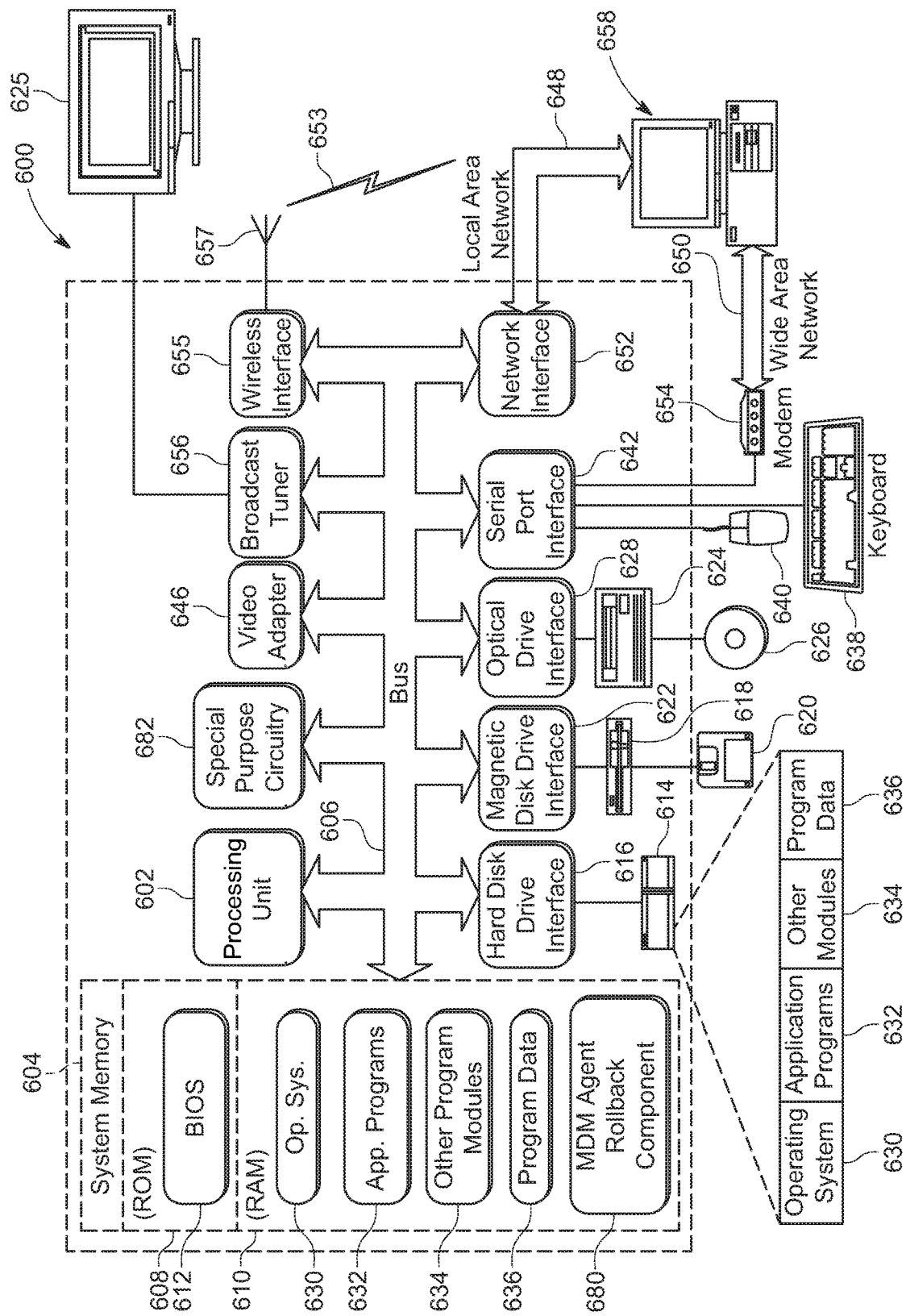
FIG. 6 is a schematic view of an exemplary computing device configured to operate in accordance with the present disclosure.

FIG. 6 is a schematic view of an exemplary system 600 in accordance with another possible embodiment. In some embodiments, the system 600 may include one or more processors (or processing units) 602, special purpose circuitry 682, a memory 604, and a bus 606 that couples various system components, including the memory 604, to the one or more processors 602 and special purpose circuitry 682 (e.g. ASIC, FPGA, etc.). The bus 606 represents one or more of any of several types of bus structures, including a memory bus or memory controller, a peripheral bus, an accelerated graphics port, and a processor or local bus using any of a variety of bus architectures. In this implementation, the memory 604 includes read only memory (ROM) 608 and random access memory (RAM) 610. A basic input/output system (BIOS) 612, containing the basic routines that help to transfer information between elements within the system 600, such as during start-up, is stored in ROM 608.

The exemplary system 600 further includes a hard disk drive 614 for reading from and writing to a hard disk (not shown), and is connected to the bus 606 via a hard disk driver interface 616 (e.g., a SCSI, ATA, or other type of interface). A magnetic disk drive 618 for reading from and writing to a removable magnetic disk 620, is connected to the system bus 606 via a magnetic disk drive interface 622. Similarly, an optical disk drive 624 for reading from or writing to a removable optical disk 626 such as a CD ROM, DVD, or other optical media, connected to the bus 606 via an optical drive interface 628. The drives and their associated computer-readable media provide nonvolatile storage of computer readable instructions, data structures, program modules and other data for the system 600. Although the exemplary system 600 described herein employs a hard disk, a removable magnetic disk 620 and a removable optical disk 626, it should be appreciated by those skilled in the art that other types of computer readable media which can store data that is accessible by a computer, such as magnetic cassettes, flash memory cards, digital video disks, random access memories (RAMs) read only memories (ROM), and the like, may also be used.

As further shown in FIG. 6, a number of program modules may be stored on the memory 604 (e.g. the ROM 608 or the RAM 610) including an operating system 630, one or more application programs 632, other program modules 634, and program data 636 (e.g. the data store 620, image data, audio data, three dimensional object models, etc.). Alternately, these program modules may be stored on other computer-readable media, including the hard disk, the magnetic disk 620, or the optical disk 626. For purposes of illustration, programs and other executable program components, such as the operating system 630, are illustrated in FIG. 6 as discrete blocks, although it is recognized that such programs and components reside at various times in different storage components of the system 600, and may be executed by the processor(s) 602 or the special purpose circuitry 682 of the system 600.

A user may enter commands and information into the system 600 through input devices such as a keyboard 638 and a pointing device 640. Other input devices (not shown) may include a microphone, joystick, game pad, satellite dish, scanner, or the like. These and other input devices are connected to the processing unit 602 and special purpose circuitry 682 through an interface 642 that is coupled to the system bus 606. A monitor 625 may be connected to the bus 606 via an interface, such as a video adapter 646. In addition, the system 600 may also include other peripheral output devices (not shown) such as speakers and printers.

The system 600 may operate in a networked environment using logical connections to one or more remote computers (or servers) 658. Such remote computers (or servers) 658 may be a personal computer, a server, a router, a network PC, a peer device or other common network node, and may include many or all of the elements described above relative to system 600. The logical connections depicted in FIG. 6 may include one or more of a local area network (LAN) 648 and a wide area network (WAN) 650. Such networking environments are commonplace in offices, enterprise-wide computer networks, intranets, and the Internet. In a networked environment, program modules depicted relative to the system 600, or portions thereof, may be stored in the memory 604, or in a remote memory storage device.

In this embodiment, the system 600 also includes one or more broadcast tuners 656. The broadcast tuner 656 may receive broadcast signals directly (e.g., analog or digital cable transmissions fed directly into the tuner 656) or via a reception device (e.g., via sensor 150, sensor 250, an antenna, a satellite dish, etc.).

When used in a LAN networking environment, the system 600 may be connected to the local network 648 through a network interface (or adapter) 652. When used in a WAN networking environment, the system 600 typically includes a modem 654 or other means for establishing communications over the wide area network 650, such as the Internet. The modem 654, which may be internal or external, may be connected to the bus 606 via the serial port interface 642. Similarly, the system 600 may exchange (send or receive) wireless signals 653 with one or more remote devices, using a wireless interface 655 coupled to a wireless communicator 657.

As further shown in FIG. 6, an MDM Agent Rollback Component 680 may be stored in the memory 604 of the system 600. The MDM Agent Rollback Component 680 may be implemented using software, hardware, firmware, or any suitable combination thereof. In cooperation with the other components of the system 600, such as the processing unit 602 or the special purpose circuitry 682, the MDM Agent Rollback Component 680 may be operable to perform one or more implementations of processes for MDM agent rollback as described herein in accordance with the present disclosure.

Accordingly, in some embodiments, a system for operating one or more mobile device management (MDM) agents comprises: at least one processor; a memory operatively coupled to the at least one processor, the memory storing processor-readable instructions configured to perform operations including at least: detecting a triggering event during operation of a first MDM agent; designating the first MDM agent as a bad agent; designating a second MDM agent as a new active agent; determining whether a first data generated by the first MDM agent is useable for continued operations by the second MDM agent; if the first data is determined to be useable by the second MDM agent, then activating the second MDM agent for continued operations using the first data; and if the first data is determined to be not useable by the second MDM agent, then activating the second MDM agent with known good data.

In some embodiments, detecting a triggering event during operation of a first MDM agent comprises detecting a crash of the first MDM agent. In some embodiments, detecting a triggering event during operation of a first MDM agent comprises detecting a commands reachability failure. And in some embodiments, detecting a triggering event during operation of a first MDM agent comprises detecting a manual initiation of an MDM agent rollback.

In addition, in some embodiments, designating the first MDM agent as a bad agent comprises changing a designation of the first MDM agent from an active agent to an inactive agent. In some embodiments, designating a second MDM agent as a new active agent comprises re-designating the second MDM agent from being an inactive agent to being the new active agent. And in some embodiments, the second MDM agent comprises an updated version of the first MDM agent.

Further, in some embodiments, designating the second MDM agent as a new active agent comprises: determining that the second MDM agent is an older version than the first MDM agent; and designating the second MDM agent as a new active agent. Alternately, in some embodiments, designating the second MDM agent as a new active agent comprises: determining that the second MDM agent is not an older version than the first MDM agent; obtaining an older MDM agent that is older than the first MDM agent; and re-designating the older MDM agent as the second MDM agent.

In further embodiments, the first data comprises first replica data stored during operation of the first MDM agent. In some embodiments, the known good data comprises second data stored during operation of the second MDM agent.

In addition, in some embodiments, a system for operating one or more mobile device management (MDM) agents comprises: at least one processor; a memory operatively coupled to the at least one processor, the memory storing an MDM master, a first MDM agent designated as an active agent, and a second MDM agent designated as an inactive agent, wherein the MDM master is configured to perform operations including at least: detecting a triggering event during operation of the first MDM agent; designating the first MDM agent as a bad agent; re-designating the second MDM agent as the active agent; and determining whether to allow the second MDM agent to use data generated by the first MDM agent or to use other data associated with the second MDM agent.

In some embodiments, detecting a triggering event during operation of the first MDM agent comprises detecting a failure signal from a monitoring tool of the first MDM agent, the failure signal being indicative of an operational failure of the first MDM agent. In some embodiments, detecting a triggering event during operation of the first MDM agent comprises detecting that a command from the first MDM agent has failed to provoke a response within a designated timeout period, and detecting that a subsequent remedial action has failed to provoke the response within the designated timeout period.

And in some embodiments, the MDM master comprises one or more privileged components configured to perform one or more operations that require device owner privileges. In further embodiments, the MDM master comprises: one or more privileged components configured to perform one or more operations that require device owner privileges; and one or more general components configured to perform one or more operations that do not require device owner privileges, at least some of the one or more general components being configured with a business logic of at least one of an MDM managed entity or an MDM managing entity. And in other embodiments, the MDM master comprises: one or more privileged components configured to perform one or more operations that require device owner privileges; and at least one of the first MDM agent or the second MDM agent comprises one or more general components configured to perform one or more operations that do not require device owner privileges, at least some of the one or more general components being configured with a business logic of at least one of an MDM managed entity or an MDM managing entity.

In further embodiments, determining whether to allow the second MDM agent to use data generated by the first MDM agent or to use other data associated with the second MDM agent comprises: determining that a first replica data generated by the first MDM agent is useable for continued operations by the second MDM agent. And in some embodiments, determining whether to allow the second MDM agent to use data generated by the first MDM agent or to use other data associated with the second MDM agent comprises: determining whether a first data generated by the first MDM agent is useable for continued operations by the second MDM agent; if the first data is determined to be useable by the second MDM agent, then activating the second MDM agent for continued operations using the first data; and if the first data is determined to be not useable by the second MDM agent, then activating the second MDM agent with known good data associated with the second MDM agent.

And in some embodiments, detecting a triggering event during operation of a first MDM agent comprises: at least one of: detecting a crash of the first MDM agent; detecting a commands reachability failure of the first MDM agent; or detecting a manual initiation of an MDM agent rollback.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, and/or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A system for operating one or more mobile device management (MDM) agents, comprising:
   at least one processor;
   a memory operatively coupled to the at least one processor, the memory storing processor-readable instructions configured to perform operations including at least:
      detecting a triggering event during operation of a first MDM agent;
      designating the first MDM agent as a bad agent;
      designating a second MDM agent as a new active agent;

determining whether a first data generated by the first MDM agent is useable for continued operations by the second MDM agent;

if the first data is determined to be useable by the second MDM agent, then activating the second MDM agent for continued operations using the first data; and if the first data is determined to be not useable by the second MDM agent, then activating the second MDM agent with known good data.

2. The system of claim 1, wherein detecting a triggering event during operation of a first MDM agent comprises detecting a crash of the first MDM agent.

3. The system of claim 1, wherein detecting a triggering event during operation of a first MDM agent comprises detecting a commands reachability failure.

4. The system of claim 1, wherein detecting a triggering event during operation of a first MDM agent comprises detecting a manual initiation of an MDM agent rollback.

5. The system of claim 1, wherein designating the first MDM agent as a bad agent comprises changing a designation of the first MDM agent from an active agent to an inactive agent.

6. The system of claim 1, wherein designating a second MDM agent as a new active agent comprises re-designating the second MDM agent from being an inactive agent to being the new active agent.

7. The system of claim 1, wherein the second MDM agent comprises an updated version of the first MDM agent.

8. The system of claim 1, wherein designating the second MDM agent as a new active agent comprises:

determining that the second MDM agent is an older version than the first MDM agent; and designating the second MDM agent as a new active agent.

9. The system of claim 1, wherein designating the second MDM agent as a new active agent comprises:

determining that the second MDM agent is not an older version than the first MDM agent;

obtaining an older MDM agent that is older than the first MDM agent; and re-designating the older MDM agent as the second MDM agent.

10. The system of claim 1, wherein the first data comprises first replica data stored during operation of the first MDM agent.

11. The system of claim 1, wherein the known good data comprises second data stored during operation of the second MDM agent.

12. A system for operating one or more mobile device management (MDM) agents, comprising:

at least one processor;

a memory operatively coupled to the at least one processor, the memory storing an MDM master, a first MDM agent designated as an active agent, and a second MDM agent designated as an inactive agent, wherein the MDM master is configured to perform operations including at least:

detecting a triggering event during operation of the first MDM agent;

designating the first MDM agent as a bad agent;

re-designating the second MDM agent as the active agent; and determining whether to allow the second MDM agent to use data generated by the first MDM agent or to use other data associated with the second MDM agent.

13. The system of claim 12, wherein detecting a triggering event during operation of the first MDM agent comprises detecting a failure signal from a monitoring tool of the first MDM agent, the failure signal being indicative of an operational failure of the first MDM agent.

14. The system of claim 12, wherein detecting a triggering event during operation of the first MDM agent comprises detecting that a command from the first MDM agent has failed to provoke a response within a designated timeout period, and detecting that a subsequent remedial action has failed to provoke the response within the designated timeout period.

15. The system of claim 12, wherein the MDM master comprises one or more privileged components configured to perform one or more operations that require device owner privileges.

16. The system of claim 12, wherein the MDM master comprises:

one or more privileged components configured to perform one or more operations that require device owner privileges; and one or more general components configured to perform one or more operations that do not require device owner privileges, at least some of the one or more general components being configured with a business logic of at least one of an MDM managed entity or an MDM managing entity.

17. The system of claim 12, wherein the MDM master comprises:

one or more privileged components configured to perform one or more operations that require device owner privileges; and wherein at least one of the first MDM agent or the second MDM agent comprises one or more general components configured to perform one or more operations that do not require device owner privileges, at least some of the one or more general components being configured with a business logic of at least one of an MDM managed entity or an MDM managing entity.

18. The system of claim 12, wherein determining whether to allow the second MDM agent to use data generated by the first MDM agent or to use other data associated with the second MDM agent comprises:

determining that a first replica data generated by the first MDM agent is useable for continued operations by the second MDM agent.

19. The system of claim 12, wherein determining whether to allow the second MDM agent to use data generated by the first MDM agent or to use other data associated with the second MDM agent comprises:

determining whether a first data generated by the first MDM agent is useable for continued operations by the second MDM agent;

if the first data is determined to be useable by the second MDM agent, then activating the second MDM agent for continued operations using the first data; and if the first data is determined to be not useable by the second MDM agent, then activating the second MDM agent with known good data associated with the second MDM agent.

20. The system of claim 12, wherein detecting a triggering event during operation of a first MDM agent comprises:

at least one of:

detecting a crash of the first MDM agent;
detecting a commands reachability failure of the first MDM agent; or
detecting a manual initiation of an MDM agent rollback.

* * * * *